Figure 1:
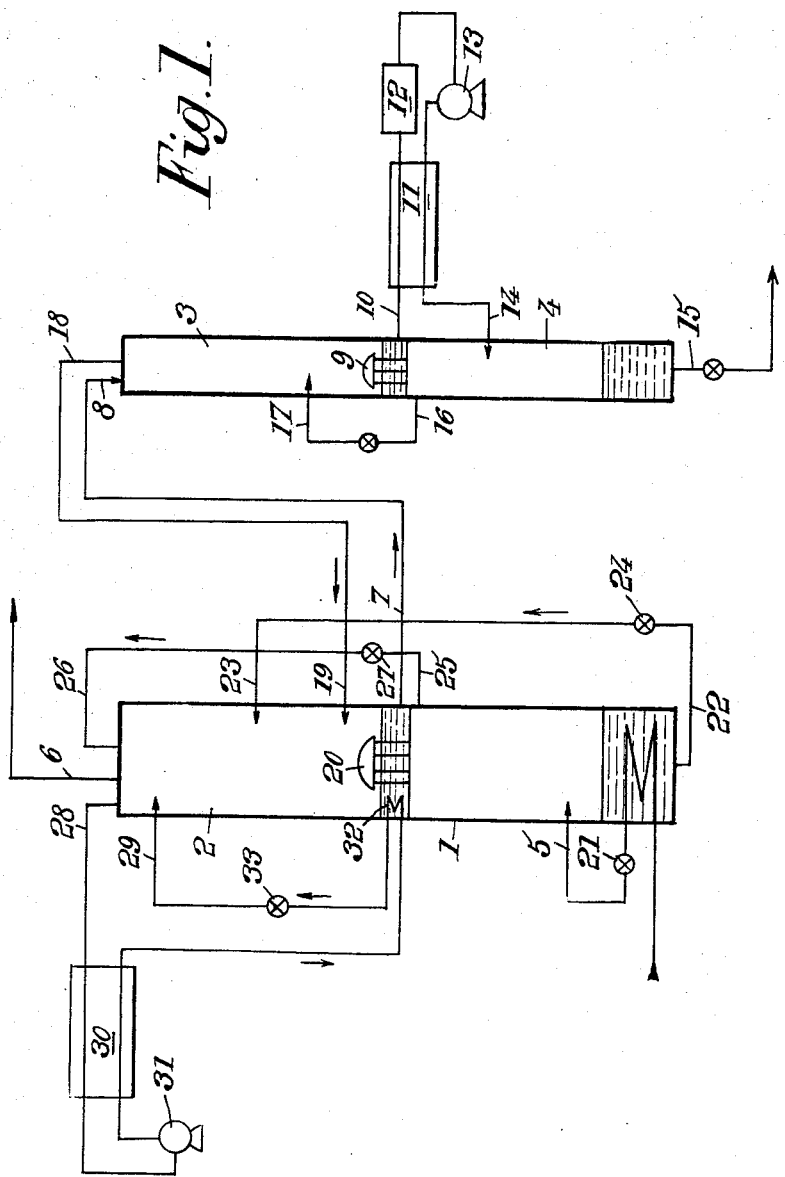

United States Patent Office 3,216,800
Patented Nov. 9, 1965

3,216,800
METHODS FOR PRODUCING DEUTERIUM
BY DISTILLATION OF HYDROGEN
Léon Stouls, Paris, France, assignor to Commissariat
a l'Energie Atomique, Paris, France, an organization of France
Filed May 1, 1961, Ser. No. 106,889
Claims priority, application France, May 2, 1960,
825,894; Nov. 9, 1960, 843,470
3 Claims. (Cl. 23—212)

The present invention relates to methods and apparatus for producing deuterium by distillation of hydrogen.

The basic principles of such a distillation which were indicated by K. Clusius and K. Starke in 1949 will first be briefly summed up with reference to FIG. 1 of the appended drawings.

Natural hydrogen, which contains about 0.014% (in atoms) of deuterium in the form of deuterium hydride HD (that is to say containing about 0.028% of HD) is purified, expanded and liquefied then fed at 5 to a big distillation column 1, 2 of the plate type, kept at a very low temperature, for instance by means of screens cooled with liquid nitrogen.

Hydrogen impoverished in deuterium (containing for instance from 30 to 60 parts per million of HD) is withdrawn at 6 at the top of the upper section 2 of a double column 1, 2 and hydrogen enriched in deuterium (containing from 0.5 to 5% of HD) is withdrawn at 7 in a lower part of said section 2 and sent at 8 into an upper part of a double distillation column 3, 4 also kept at very low temperature.

This double column consists of two elementary columns 3 and 4 of relatively small diameter provided with a packing or plates, disposed one above the other and connected together through a vaporizer-condenser 9.

The liquid fractions enriched in the heavier molecules collect at the bottom of this column.

Deuterium hydride, practically free from hydrogen, is collected at 10 at the bottom of the upper column 3. This HD is sent through a series of heat exchangers 11, then through a catalysis vessel 1, where it is transformed either at ordinary temperature or at a higher temperature (for instance 100° C.), into a mixture consisting approximately of 25% of hydrogen, 25% of deuterium, and 50% of deuterium hydride (according to the equilibrium reaction $2HD \rightleftharpoons H_2 + D_2$). The mixture extracted from vessel 12 is then compressed at 13, cooled down, for instance to 25° K., by passage through the series of heat exchangers 11 and reintroduced at 14 into the lower column 4, some plates below the top thereof.

At the bottom of the lower column 4, which will be hereinafter called "final" column, at 15 deuterium practically free from hydrogen but relatively rich in tritium is collected as it will be hereinafter explained.

The gaseous fractions impoverished in deuterium are withdrawn at the top of the column.

Hydrogen and a portion of the HD introduced at 14 are extracted at the top 16 of the final column and reintroduced at 17 into the upper column, some plates above vaporizer 9.

The hydrogen impoverished in HD that is collected at 18, at the top of the upper column, is reintroduced at 19 into column 1–2.

This last mentioned column may be a single column but it is preferable, as shown, to make it in the form of a double column comprising a lower column 1 and an upper column 2, disposed one above the other and separated from each other by a vaporizer-condenser 20.

Natural hydrogen is admitted at 5 into the lower column 1 after expansion through a valve 21. A fraction of this hydrogen enriched in HD is collected at the bottom 22 of the lower column 1 and reintroduced at 23 into the upper column 2 after passage through a valve 24. The remainder, impoverished in HD, is collected at the top 25 of the lower column and reintroduced at 26 to the top of the upper column after passage through valve 27.

An important amount of hydrogen, impoverished in HD, that reaches the top of the upper column 2 in gaseous form is collected at 28 and sent to an auxiliary circuit acting as a condenser, to be subsequently reintroduced into said top of the column at 29 in the liquid state. This circuit, the presence of which improves the reflux necessary for a good operation of said column, comprises for instance a series of heat exchangers 30, a compressor 31, a coil 32 immersed in the bottom portion (or "boiler") of said column, and an expansion valve 33.

To sum up, the apparatus which has been described permits of extracting from natural hydrogen most of the deuterium it contains, the hydrogen impoverished in deuterium being subsequently recovered to be used for practically the same purposes as natural hydrogen.

But the deuterium that is thus extracted is relatively rich in tritium, which enters into the composition of the heaviest molecules ($T_2$, DT, HT) of the distilled mixtures. This high proportion of tritium may constitute a serious drawback for many uses of pure deuterium.

In a heavy water prepared by burning deuterium obtained as above described, this percentage in tritium is for instance of about $10^{-14}$ and may reach $10^{-12}$ and even more.

In order to obviate these drawbacks, according to the present invention, at least the final column is given a number of theoretical plates such that enrichment of the mixture in tritium begins only at a level of the column which is lower than the level at which maximum or practically maximum enrichment of this mixture in deuterium (or in HD) had been reached, whereby the deuterium (or HD) containing a low proportion of tritium is withdrawn at a level intermediate between these two above mentioned levels and the fractions rich in tritium are withdrawn at the bottom of said column.

It has been found that, if the enrichment in tritium is substantially proportional to the enrichment in deuterium along a distillation column containing a small number of theoretical plates, this is no longer true with a column containing a great number of plates. In this latter case, if the downward travel through the column of the mixture undergoing distillation is considered, enrichment of this mixture in deuterium is obtained, and reaches its maximum value, before its enrichment in tritium has begun. It is therefore possible to find in the column a zone from which the distilled products can be withdrawn with a high percentage of deuterium and a relatively low percentage of tritium.

It is this step which is applied according to the invention for the extraction of deuterium from the final column and preferably also for the extraction of HD from the column element (upper column 3) located above it.

In order to further reduce the proportion of tritium in the deuterium that is obtained, the tritium hydride HT present in the final column is made to undergo a catalytic reaction in a deuterium medium in such manner as to transform it partly into HD and DT, which products are easier to separate from deuterium ($D_2$) than HT.

According to still another feature of the invention, relative to the case where the preconcentration column is a double column (1, 2), as above described, instead of recycling into the upper column the fraction of hydrogen impoverished in HD collected at the top of the lower column, there is extracted directly, from said top of the lower column, hydrogen containing a very low proportion of HD (less than 5 p.p.m.), the number of plates contained in said lower column being chosen sufficiently high for this purpose.

Preferred embodiments of the present invention will be hereinafter described with reference to the accompanying drawings, given merely by way of example and in which:

FIG. 1, which has already been referred to, illustrates the prior art.

Figure 2:
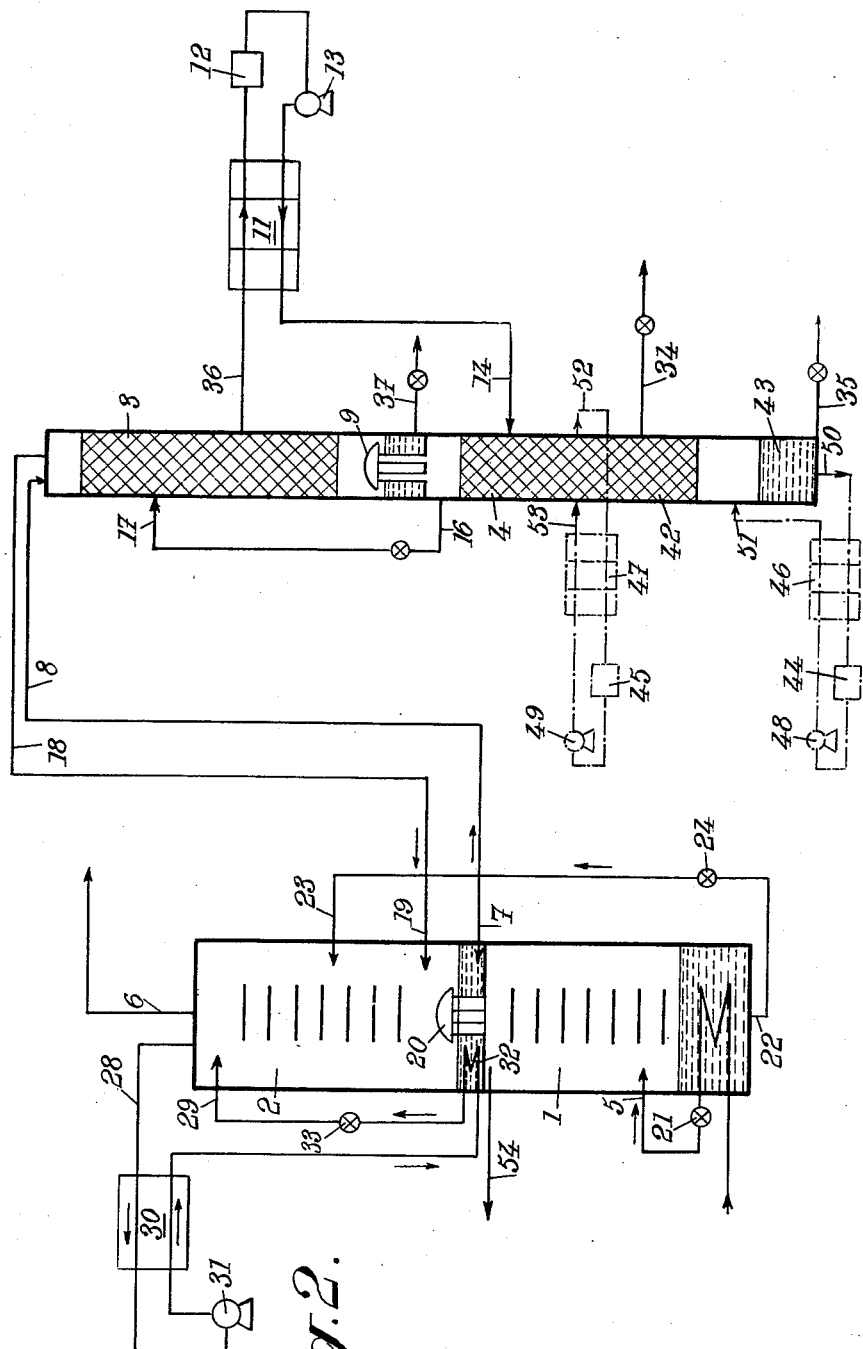

FIG. 2 diagrammatically shows an apparatus for producing deuterium according to the invention.

Figure 3:
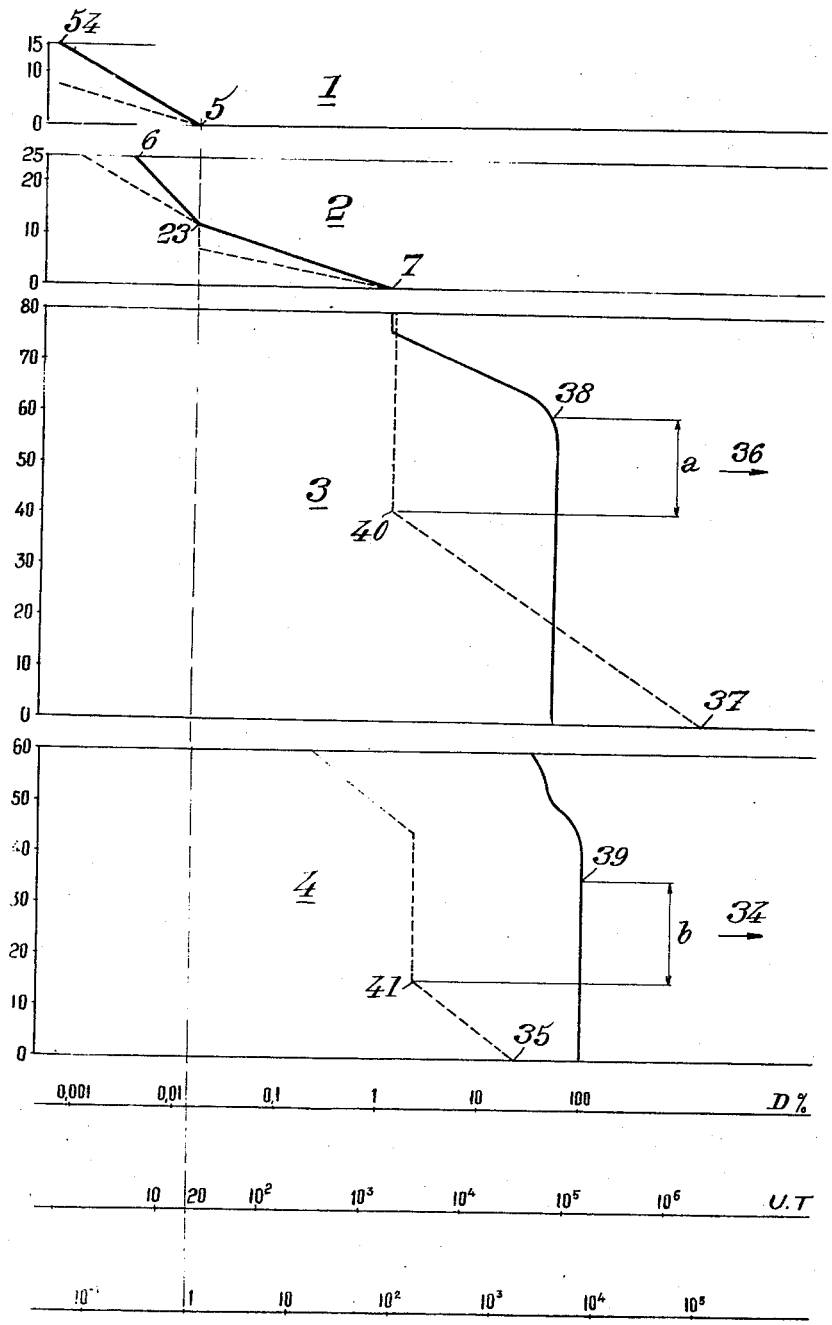

FIG. 3 shows curves indicating the concentrations of deuterium and tritium in mixtures treated in such an apparatus according to an example of the invention.

The elements of FIG. 2 which have the same functions as those already described with reference to FIG. 1 have been given the same reference numbers.

FIG. 2 essentially comprises the following elements:

A preconcentration column 1, 2, with interposed vaporizer 20, fed at 5 with natural hydrogen and delivering, respectively, at 6 hydrogen impoverished in HD and at 7 hydrogen enriched in HD;

A double column 3, 4 comprising an upper column 3 and a lower or "final" column 4, with a vaporizer 9 interposed between them;

A catalytic reaction circuit 11, 12, 13, 14 feed conduits 7–8, reintroduction conduits 16–17, 18–19, 22 to 24 and a condenser circuit 28 to 33.

But instead of withdrawing deuterium at the bottom of a final column 4 containing a small number of theoretical plates (for instance less than 30) this column is given a great number of theoretical plates (for instance more than 40) so that there exists in this column a zone where the enrichment in deuterium is practically maximum and where the enrichment in tritium has practically not yet begun. Deuterium is withdrawn from this zone at 34 (that is to say much higher than in the prior art) and the mixture rich in tritium accumulated at the bottom of the column is withdrawn at 35.

In a similar manner, instead of withdrawing HD from the bottom of an upper column 3 having a relatively small number of theoretical plates (for instance less than 30) said column is given a great number (more than 40) of theoretical plates such that there can exist in this column a zone where the enrichment in HD is practically maximum and where the enrichment in HT has practically not yet begun, this zone being that from which there is withdrawn at 36 (much higher than in the prior art), the HD that is sent to the catalytic reaction circuit 11, 12, 13, 14, the mixture rich in tritium accumulated at the bottom of the column being extracted through 37.

FIG. 3 permits of easily identifying the zones above referred to and comprises several curves the ordinates representing the number of theoretical plates of the respective columns 1, 2, 3 and 4 and the abscissas representing, with a logarithmic scale, the percentage of deuterium or tritium in the mixtures distilled in said columns 1, 2, 3, 4.

Three scales have been indicated in abscissas.

One of them gives, in atomic percentage, the total proportion of deuterium (D%) in the mixtures.

The second one indicates the proportion of tritium in said mixtures calculated in tritium units (the tritium unit U.T. being the atomic ratio $$\frac{T}{H+D} \times 10^{-18}\Big)$$

The third one indicates the enrichment of the mixtures in deuterium or tritium, that is to say the ratio of the percentage thereof at a given point to the corresponding initial percentage.

The curves corresponding to deuterium are in solid lines, and those corresponding to tritium in dotted lines.

In the example (given merely by way of indication) to which these curves relate, the four columns 1, 2, 3, 4 have numbers of theoretical plates equal to 15, 25, 80 and 60 respectively. The natural hydrogen introduced at 5 into column 1 contains 0.028% of HD (that is to say 0.014% of deuterium atoms) and 20 tritium units.

It will be seen that the enrichments in deuterium and tritium at the bottom of column 2 (at 7) are the same and average 100.

On the contrary, in columns 3 and 4, the enrichment in deuterium practically reaches its maximum (points 38 and 39 respectively) much before the enrichment in tritium has practically begun (at 40 and 41); the levels of points 38 and 40 on the one hand and those of points 39 and 41 on the other hand limit the zones, having respective heights $a$ and $b$, from which the distillation products are withdrawn (HD at 36 in column 3, $D_2$ at 34 in column 4).

As illustrated, it may be considered that a percentage of 90% for HD and a percentage of 99.8% (nuclear purity) for $D_2$ may be considered as maximum.

The lengths $a$ and $b$ (that is to say the numbers of theoretical plates corresponding to these lengths) must be such that their small variations during the operation do not modify their respective positions and that the levels of the column 36 and 34 where the products are withdrawn are constantly within the zones defined by these heights.

It must be noted that if the fractions rich in tritium that reach the bottoms of columns 3 and 4 were not evacuated, they would accumulate in these column bottoms and the levels 40, 41 of the curves would be raised. This is prevented by withdrawal through conduits 37 and 35.

The tritium $T_2$ introduced into the apparatus together with the natural hydrogen is in the form of hydride HT.

It is concentrated in this form in columns 1, 2 and 3.

In circuit 36, 11, 12, 13, 11, 14 the fractions of HT carried along by the stream of HD undergo a catalytic equilibrium reaction as above referred to, so as to be partly transformed into DT.

It may be considered that in the final column 4 tritium is in the form of HT and DT in variable proportions having the same order of magnitude.

The heavy fraction DT concentrates easily at the bottom of column 4 and may be withdrawn through conduit 35.

But the same is not true for the fraction HT, the vapor tension of which is very close to that of $D_2$ so that most of this HT is mixed with $D_2$.

In order to obviate this drawback it is advantageous to transform this HT fraction into the state of DT which can easily be eliminated.

For this purpose, said HT fraction is made to undergo a catalysis in a deuterium medium which transforms it into HD and DT according to the following balanced reaction:

$$HT + D_2 \rightleftharpoons HD + DT$$

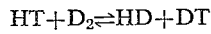

The DT that is obtained is evacuated at 35.

As for the HD that results from this reaction, it is either recycled at 17 together with the other volatile fractions or carried along by the deuterium that is withdrawn, which is not a great inconvenience because the number of HD molecules having HT as origin can be put very low.

There are four possibilities of applying this reaction, these possibilities being illustrated in FIG. 2 by way of example.

(1) The catalyst (which is for instance platinum or palladium on conventional supports) is disposed directly in an intermediate zone of the final column 4, at 42;

(2) The catalyst is disposed in the boiler of said column at 43;

(3) and (4) The catalyst is disposed in an external vessel (44–45) and the fluid to be subjected to catalysis is collected in a continuous manner at a low point of column 4 (where the total percentage in deuterium is high), passes successively through a heat exchanger (46, 47), said vessel (44, 45), a compressor (48, 49) and once more the heat exchanger, before being reintroduced into the column:

The point from which such a circuit starts being either disposed in the boiler at 50, the other end of the circuit being located above the boiler at 51 (modification 3).

Or the outlet end of this circuit is located at 52 in an intermediate zone of column 4, the inlet end being located at point 53 diametrically opposed to 52, either at the same level (modification 4) or at a little different level.

It is sometimes very useful to obtain hydrogen which is practically free from deuterium.

Such a product may be easily withdrawn at 54 from the top of column 1 if care is taken to give the number of theoretical plates of this column a sufficient value. In the example shown by FIGS. 2 and 3, a number of 15 plates for said column permits of extracting hydrogen containing less than 5 parts per million of deuterium hydride.

Merely by way of indication, some data are given concerning the example illustrated by FIGS. 2 and 3.

The flow rate of natural hydrogen introduced at 5 is 2700 M.$^3$ per hour, that of hydrogen impoverised in HD sent through condensation circuit 28–33 is 4500 M.$^3$ per hour, that of hydrogen enriched in HD sent to the top of column 3 is 150 M.$^3$ per hour, that of HD sent through the catalytic circuit 11–13 is 600 liters per hour, that of the volatile fractions recycled at 17 is 420 liters per hour, that of the mixture circulating through a catalytic circuit such as 52–47–45–49–53 is 2 M.$^3$ per hour, that circulating through each of the conduits 37 and 35 is 20 liters per hour and that of the deuterium withdrawn at 34 is 160 liters per hour.

This deuterium withdrawn at 34 contains only 4000 U.T., whereas the product passing through conduit 37 contains $1.8 \times 10^6$ U.T. and that flowing through conduit 35, 30,000 U.T.

If the operations are conducted in conditions more favorable than those of the above indicated example, it is possible to obtain better yields and to divide by 10, 100 or even more the amount of tritium present in the deuterium that is produced.

The invention permits of obtaining, by making relative small modifications to a known apparatus:

Deuterium containing a very small amount of hydrogen and tritium,

Hydrogen practically free from deuterium and tritium,

Deuterium (or HD) wherein the percentages of tritium are as high as it is desired and which may, in particular, correspond to enrichments in tritium much higher than the enrichments in deuterium.

It should be noted that the invention might be generalized by effecting a withdrawal at an intermediate level and an extraction at the bottom of column 2.

The interest of such an apparatus is not limited to the distillation of hydrogen and it may be usefully employed for other gases which contain hydrogen such as air, ammonia, hydrocarbons, industrial gases, and so on.

What I claim is:
1. A method of producing deuterium substantially free of tritium which comprises introducing at the top of a distillation column a mixture consisting of liquid hydrogen enriched in deuterium and containing tritium, withdrawing the most volatile fraction of the mixture, which consists essentially of hydrogen gas, from the head of the column, producing in the middle portion of the column a zone of enrichment of deuterium while maintaining the concentration of tritium in said zone substantially constant, accumulating liquid enriched in tritium in the lowermost portion of the column, withdrawing said liquid which contains substantially the entire introduced tritium from the bottom of the column, and withdrawing a fraction enriched in deuterium and substantially free of tritium from a lower part of said middle portion of the column.

2. A method as claimed in claim 1 which includes providing an upper column above said distillation column, interposing a vaporizer-condenser between said two columns, feeding a hydrogen mixture enriched in deuterium hydride to the top portion of said upper column, providing in the middle portion of said upper column a zone of enrichment in deuterium hydride without enrichment in tritium hydride, providing in the bottom portion of said upper column a zone of accumulation of liquid enriched in tritium hydride, withdrawing said tritium hydride enriched liquid, collecting deuterium hydride enriched liquid from said middle portion of said upper column, raising the temperature of said collected liquid, catalytically transforming said collected liquid to a mixture of hydrogen, deuterium, deuterium hydride and tritium, compressing said mixture, and cooling said mixture by heat interchange with said collected liquid, said mixture constituting the mixture introduced at the top of the distillation column.

3. A method as claimed in claim 1 which further comprises subjecting the tritium hydride present in said distillation column to a catalytic reaction with deuterium from said column to form deuterium hydride and tritium deuteride.

References Cited by the Examiner
UNITED STATES PATENTS 2,908,554  10/59  Hoogschagen _____ 23—210
2,927,003   3/60  Becker _____ 23—211

OTHER REFERENCES

National Bureau of Standards (Journal of Research), vol. 47 (1951), QC 1 V511, pages 449–55.

Production of Heavy Water, National Nuclear Energy Series, Div. III, vol. 4F (1955), pages 87–90.

"Some Characteristics of Stedman Packing in the Distillation of Hydrogen and Its Isotopes," by Fookson, Pomeranty, and Rothberg.

MAURICE A. BRINDISI, *Primary Examiner.*

JAMES H. TAYMAN, JR., *Examiner.*